United States Patent
Rick (10) Patent No.: US 8,991,858 B2
(45) Date of Patent: Mar. 31, 2015

(54) SIDE AIRBAG

(71) Applicant: GM Global Technology Operations LLC, Detroit, MI (US)

(72) Inventor: Ulrich Rick, Braunweiler (DE)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/097,698

(22) Filed: Dec. 5, 2013

(65) Prior Publication Data

US 2014/0175775 A1    Jun. 26, 2014

(30) Foreign Application Priority Data

Dec. 5, 2012 (DE) .......... 10 2012 023 776

(51) Int. Cl.
| | |
|---|---|
| B60R 21/232 | (2011.01) |
| B60R 21/233 | (2006.01) |
| B60R 21/231 | (2011.01) |
| B60R 21/013 | (2006.01) |
| B60R 21/263 | (2011.01) |

(52) U.S. Cl.
CPC ......... *B60R 21/23138* (2013.01); *B60R 21/232* (2013.01); *B60R 21/013* (2013.01); *B60R 21/263* (2013.01); *B60R 2021/23107* (2013.01)
USPC ...... 280/730.2; 280/729; 280/735; 280/743.1

(58) Field of Classification Search
CPC .. B60R 21/015; B60R 21/232; B60R 21/233; B60R 21/2338; B60R 21/263; B60R 2021/01211; B60R 2021/01225; B60R 2021/01238; B60R 2021/015; B60R 2021/10575; B60R 2021/233; B60R 2021/23308; B60R 2021/2338; B60R 2021/263; B60R 2021/2633
USPC ........... 280/729, 730.1, 730.2, 732, 735, 736, 280/741, 743.1, 743.2
See application file for complete search history.

(56) References Cited

U.S. PATENT DOCUMENTS

| | | | | |
|---|---|---|---|---|
| 5,454,591 | A | * | 10/1995 | Mazur et al. ................. 280/735 |
| 5,602,734 | A | | 2/1997 | Kithil |
| 5,782,485 | A | * | 7/1998 | Takeda et al. ................ 280/735 |
| 5,851,026 | A | * | 12/1998 | Schoos et al. ................ 280/735 |
| 5,936,412 | A | * | 8/1999 | Gershenfeld et al. ......... 324/663 |

(Continued)

FOREIGN PATENT DOCUMENTS

| | | |
|---|---|---|
| DE | 19703945 A1 | 8/1998 |
| DE | 19707997 A1 | 9/1998 |

(Continued)

OTHER PUBLICATIONS

German Patent Office, German Search Report for Application No. 102012023776.6, dated Jul. 16, 2013.

(Continued)

*Primary Examiner* — Ruth Ilan
*Assistant Examiner* — Laura Freedman
(74) *Attorney, Agent, or Firm* — Ingrassia Fisher & Lorenz, P.C.

(57) ABSTRACT

A side airbag gas bag is provided for a motor vehicle, in particular a passenger car. The gas bag includes, but is not limited to an occupant region and a child seat region adjoining thereon, which with inflated gas bag optionally forms a recess for receiving a contour of a child seat or a volume for the lateral protection of an occupant.

13 Claims, 7 Drawing Sheets

(56) References Cited

U.S. PATENT DOCUMENTS

| | | | |
|---|---|---|---|
| 5,954,360 A * | 9/1999 | Griggs, III et al. | 280/735 |
| 6,123,357 A * | 9/2000 | Hosoda et al. | 280/730.2 |
| 6,158,768 A * | 12/2000 | Steffens, Jr. et al. | 280/735 |
| 6,260,879 B1 | 7/2001 | Stanley | |
| 6,513,829 B1 * | 2/2003 | Zumpano | 280/730.1 |
| 6,719,325 B2 * | 4/2004 | Ingemarsson | 280/735 |
| 6,846,008 B2 * | 1/2005 | Kamiji et al. | 280/729 |
| 7,232,182 B2 * | 6/2007 | Yoshida | 297/216.11 |
| 7,350,804 B2 * | 4/2008 | Bakhsh et al. | 280/730.2 |
| 7,607,683 B2 * | 10/2009 | Fischer et al. | 280/730.1 |
| 7,695,012 B2 * | 4/2010 | Libby et al. | 280/743.1 |
| 7,806,431 B2 | 10/2010 | Yamada et al. | |
| 7,914,041 B2 * | 3/2011 | Aranzulla et al. | 280/743.2 |
| 7,931,297 B2 * | 4/2011 | Abe et al. | 280/739 |
| 8,342,573 B2 * | 1/2013 | Kwon | 280/743.2 |
| 8,573,639 B1 | 11/2013 | Markusic et al. | |
| 2003/0193176 A1 | 10/2003 | Ott et al. | |
| 2005/0008279 A1 | 1/2005 | Carlson et al. | |
| 2008/0054602 A1 | 3/2008 | Yang | |

FOREIGN PATENT DOCUMENTS

| | | |
|---|---|---|
| DE | 19843111 A1 | 3/2000 |
| DE | 10038427 A1 | 3/2002 |
| DE | 202006002605 U1 | 6/2006 |
| DE | 10063504 A1 | 7/2007 |
| JP | 2008143481 A | 12/2009 |

OTHER PUBLICATIONS

Search Report dated Apr. 8, 2014 for GB 1318223.3 (mailed Apr. 9, 2014).

* cited by examiner

SIDE AIRBAG

CROSS-REFERENCE TO RELATED APPLICATION

This application claims priority to German Patent Application No. 10 2012 023 776.6, filed Dec. 5, 2012, which is incorporated herein by reference in its entirety.

TECHNICAL FIELD

The technical field relates to a side airbag gas bag for a motor vehicle, a side airbag arrangement having such a side airbag gas bag, a motor vehicle having such a side airbag arrangement and to a method for inflating such a side airbag gas bag.

BACKGROUND

Motor vehicle child seats become increasingly more voluminous, in particular as a result of increasing active and/or passive protection systems such for example large-area side cheeks in the head region, as a result of adjusting mechanisms for adjusting the seat size to the growing body size of children and the like. More voluminous children seats can influence the unfurling of side airbags and/or be claimed by inflated side airbags. From DE 102 16 111 A1 an airbag system with a front passenger side airbag and a rear passenger side airbag is known, which with a child seat identified, can be separately deactivated seat-related.

In view of the foregoing, at least one object is to improve a motor vehicle with a side airbag arrangement in particular its operation. In addition, other objects, desirable features and characteristics will become apparent from the subsequent summary and detailed description, and the appended claims, taken in conjunction with the accompanying drawings and this background.

SUMMARY

A side airbag gas bag is provided in order to be inflated with gas from an inflating device, in order to protect a vehicle occupant in the event of an accident, in particular to alleviate or to prevent a collision with a lateral vehicle structure. To this end, a control device senses an accident that is imminent or has occurred in a manner known per se, for example acceleration sensors, distance sensing or the like, and activates the inflating device, in particular one or a plurality of gas generators.

The controller device is a hardware and/or software design, in particular comprising a processing unit in particular microprocessor unit (CPU) that is in particular digital and preferentially data connected or signal connected to a storage and/or bus system and/or one or a plurality of programs or program modules. The CPU can be designed in order to execute commands which are implemented as a program stored in a storage system, to detect input signals from a data bus and/or emit output signals to a data bus. A storage system can comprise one or a plurality of in particular different storage media, in particular optical, magnetic, solid-state and/or other non-volatile media. The program can be so constituted that it embodies or is capable of carrying out the methods described here so that the CPU can carry out the steps of such methods and thereby can in particular control the inflating device.

According to an embodiment, the gas bag comprises an occupant region and one, two or more child seat regions, which with inflated gas bag optionally form a recess for receiving a contour of a child seat or a volume for the lateral protection of an occupant. Receiving is to mean in particular that the child seat contour with inflated gas bag, in particular seen in vehicle transverse direction, can at least partially dip into a contact plane defined by the occupant region or the contact plane is set back in the region of the child seat region in order to create space for the child seat contour. A child seat contour can in particular be a side cheek of a head, neck and/or thorax protection of the child seat or a preferentially upper region of a side cheek of the child seat.

If a child seat region of the gas bag forms a recess for receiving a contour of a child seat, an undesirable interaction between child seat and gas bag can thereby be reduced or avoided in an embodiment, which influences an unfurling of the gas bag and/or claims the child seat through the inflated gas bag. If, by contrast, no child seat is present, the child seat region of the gas bag can form a volume for the lateral protection of an occupant.

In an embodiment, one or a plurality of child seats adjoin the occupant region. Because of this an occupant protection, in particular for further occupants and/or for a child that is present in the child seat can be made available adjoining the child seat region beyond the contour of the child seat. Thus, the risk of a collision for example of an occupant who is present next to a child seat with a lateral vehicle structure next to the child seat can be reduced.

In an embodiment, the occupant region and one or a plurality of child seat regions are connected to one another in a materially joined manner. They can in particular be sewn, bonded and/or welded together. In a further development, the occupant region and one or a plurality of child seat regions are formed integrally with one another and are defined or delimited against one another in particular through local changes in wall thickness, in particular thin areas and/or thickened areas, stiffness, in particular inserts, through textile, bonded and/or welded joints. Because of this, the protective effect can be improved in an embodiment.

In an embodiment with inflated gas bag, the occupant region and one or a plurality of child seat regions, which form a volume for the lateral protection of an occupant, form a common, in particular continuous contact area in order to improve the protective effect. In particular at the boundaries between occupant region and child seat region, this contact area can comprise gaps in order to optimize the unfurling of the individual regions. In an embodiment, a volume formed through the occupant region with inflated gas bag and a volume formed through an adjoining child seat region contact one another at least at one point, in a further development in a contact area which amounts to at least approximately 50 cm$^2$, in particular at least approximately 100 cm$^2$. Equally, with inflated gas bag, a gap can remain between a volume formed through the occupant region and a volume formed through an adjoining child seat region, which in a further development amounts to a maximum of approximately 10 cm, in particular a maximum of approximately 5 cm, in order to offer occupant protection directly next to the child seat contour and/or with inflated occupant region and child seat region.

A child seat region in an embodiment can be assigned in particular to a child seat arranged on a front seat. Additionally or alternatively, a child seat region in an embodiment can be assigned to a child seat arranged on a back seat. Additionally or alternatively, a child seat region in an embodiment can be assigned to a child seat arranged on a middle row of a vehicle having three or more rows of seats. In an embodiment, the side airbag gas bag comprises one or a plurality of further child seat regions, which with inflated gas bag optionally form a recess for receiving a contour each of a further child seat or a volume for the lateral protection of an occupant.

In an embodiment, one or a plurality of child seat regions are each defined by a separate, optionally inflatable chamber of the gas bag. A separate chamber, which defines a child seat region, can be connected in particular in a materially joined manner to one or a plurality of chambers, which define the single or multi-chambered occupant region, and/or with one or a plurality of chambers, each of which define a further child seat region. The chambers can in particular be sewn, bonded and/or welded to one another, in a further development, be integrally formed with one another. A chamber, which defines a child seat region, can be optionally inflated differently, in particular more, preferentially completely in order to form a volume for the lateral protection of an occupant, and less, preferentially not, in order to form a recess for receiving a contour of a child seat.

Additionally or alternatively, one or a plurality of child seat regions can each be defined through an optionally releasable limitation device. A limitation device can in particular comprise one or a plurality of catch bands, compression bands or the like, preferentially one or a plurality of ignition pills or the like. In a further development, the limitation device comprises an in particular pyrotechnical severing means for the destructive severing of a structure of the limitation device, in particular one or a plurality of catch bands, compression bands or the like, in particular one or a plurality of ignition pills or the like. The limitation device, which defines a child seat region, can be optionally released before, during or after a inflating of the gas bag in order to form a volume for the lateral protection of an occupant, or not released in order to form a recess for receiving a contour of a child seat.

A side airbag arrangement according to an embodiment comprises a inflating device and one or a plurality of side airbag gas bags that are inflatable by these and a control device for controlling the inflating device and/or for the optional forming of the recess or of the volume of one or a plurality of child seat regions of one or a plurality of side airbag gas bags. The inflating device can comprise one or a plurality of gas generators, in particular storage gas generators, pyrotechnical gas generators and/or hybrid gas generators, which can pyrotechnically generate gas and release gas stored under pressure.

In an embodiment, the inflating device comprises one or a plurality of gas generators for inflating the occupant region and one or a plurality of further gas generators for the optional inflating of one or a plurality of child seat regions defined through a separate chamber of the gas bag. In particular, further gas generators can be arranged in the vicinity of the child seat regions to be inflated and the inflating distances thereby shortened. In an embodiment, a further gas generator for inflating a plurality of child seat regions can be equipped in order to advantageously reduce the space requirement of the inflating device. Additionally or alternatively, two or a plurality of further gas generators can be equipped for inflating the same child seat region, in particular in order to more reliably fill the child seat region. The control device can activate the gas generator or the further gas generators individually or by groups in order to optionally fill the child seat region or the child seat regions in this way.

Additionally or alternatively, the inflating device can comprise one or a plurality of multi-stage gas generators, which are each equipped for inflating the occupant region and for optionally inflating one or a plurality of child seat regions defined through a separate chamber of the gas bag. The control device can activate the multi-stage gas generator or gas generators in steps in order to optionally fill the child seat region or child seat regions in this way. In particular, the occupant region can be inflated through a first stage, a child seat region optionally through a second stage and in a further development a further child seat region optionally through a third stage of a multi-stage gas generator. In a further development, a multi-stage gas generator comprises two, three or more stages. The ignition of the second and/or further stages takes place optionally.

If two or more child seat regions are inflated by the same gas generator, it can be provided in an embodiment that these child seat regions all form volumes for the lateral protection in the case that no child seat has been sensed for at least one of these child seat regions in order to reliably protect occupants on vacant vehicle seats in this way. Equally it can also be provided in an embodiment that two or more child seat regions which are inflated by the same gas generator all form recesses for receiving a contour of the a child seat in the case that for at least one of these child seat regions a child seat has been sensed in order to avoid the gas bag being interfered with by the at least one child seat. If two or more child seat regions are inflated by the same gas generator, it can also be provided in a further embodiment that these child seat regions individually optionally form volumes for the lateral protection of an occupant or recesses for receiving a contour of a child seat, depending on whether a child seat has been sensed for the respective child seat region or not. This can for example be effected through individual releasing or non-releasing of limitation device, which despite the inflating of a child seat region can form a recess for receiving a contour of a child seat.

When inflating one or a plurality of side airbag gas bags, the recess or the volume of one or a plurality of child seat regions of the gas bag or of the gas bags is formed according to an embodiment. Accordingly, the control device is equipped in an embodiment to optionally form the recess or the volume of one or a plurality of child seat regions of the gas bag or of the gas bags during the inflating of one or a plurality of side airbag gas bas.

In an embodiment, it can be manually predetermined or selected in advance for one or a plurality of child seat regions, in particular individually or by groups if during the inflating these child seat regions are to form the recess or the volume. The control device then activates for example the inflating device during the inflating and/or releases the fastening means, for example through the optional igniting of ignition pills or the like. Additionally or alternatively, it can also be predetermined or selected automatically in advance for one or a plurality of child seat regions, in particular individually or by groups, if during the inflating these child seat regions are to form the recess or the volume. In particular, the forming of the recess can be automatically selected for a child seat region when a child seat spatially assigned to this child seat region is present or sensed.

For a child seat region the forming of the volume can be automatically selected when a child seat spatially assigned to this child seat region is not present or not sensed. For a child seat region, the forming of the volume can be automatically selected when a child seat spatially assigned to this child seat region is not present or is not sensed. In an embodiment, the forming of the volume is selected as default in order to also make available a volume for the lateral protection of an occupant in the child seat region when in doubt.

In an embodiment, the control device comprises a sensing device for the automatic sensing of one or a plurality of child seats. The sensing device can be equipped in particular in order to sense a child seat when a child lock is activated and/or a fastening of a child seat such as in particular an ISOFIX fastening system is closed. Additionally or alternatively, the sensing device can comprise a manually actuatable switching means for selecting between a forming of the recess or of the volume of one or of a plurality of child seat regions. The switching means can for example comprise a switch or a sub-menu of an on-board computer.

A child seat contour, for the receiving of which a child seat region is provided, can be a contour of a separate child seat fastened in particular releasably on a vehicle seat or of a child seat, in particular a child seat that can be folded out which is integrated in the vehicle seat. A side airbag gas bag can be designed in particular for the lateral head and/or thorax and/or hip protection of an occupant and/or be arranged on a vehicle roof.

The motor vehicle can comprise one or a plurality of belt pretensioners in order to pretension safety belts in the event of an accident. In an embodiment, a pretensioning of a safety belt is omitted in the event that a child seat region assigned to this seat with inflated gas bag forms a recess for receiving a contour of a child seat, since in this case the control device has sensed the presence of a child seat on this seat. If by contrast the child seat region with inflated gas bag forms a volume for the lateral protection of an occupant, the assigned safety belt is also pretensioned.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
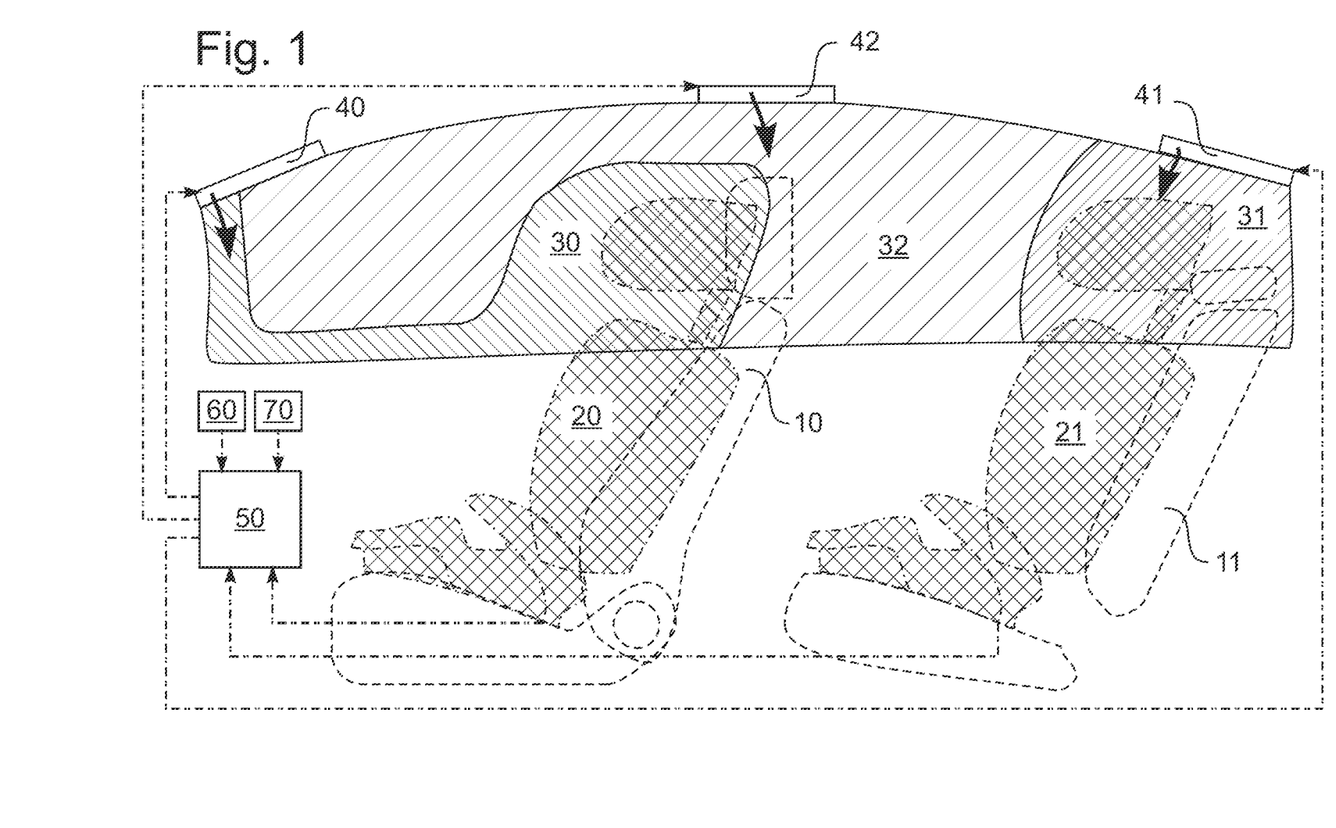
FIG. 1 is a motor vehicle with a side airbag arrangement with an inflated side airbag gas bag according to an embodiment in a lateral view.

FIG. 1 shows a motor vehicle with a side airbag arrangement with an inflated side airbag gas bag according to an embodiment in a lateral view. The motor vehicle comprises a front seat 10 and a back seat 11, on each of which a child seat 20 and 21 respectively are releasably fastened, for example by means of an ISOFIX fastening system.

The side airbag gas bag comprises a first child seat region 30, which is assigned to the front child seat 20, and a second child seat region 31, which is assigned to the back child seat 21. Adjoining both child seat regions 30, 31, the side airbag gas bag comprises an occupant region 32.

The child seat regions 30, 31 and the occupant region 32 are defined by separate optionally inflatable chambers of the gas bag, which are integrally formed with one another and are delimited from one another for example through bonded joints welded joints or textile joints, so that with inflated chambers 30-32 form a common at least substantially continuous contact area are formed for the head protection. The gas bag is arranged on a vehicle roof (at the top in FIG. 1), stowed there in the uninflated state and unfurls downwards during inflating. Additionally or alternatively to the curtain airbag for the head protection exemplarily shown in the exemplary embodiments, a gas bag can be provided in particular also for thorax and/or hip protection.

An inflating device comprises a gas generator 42 for inflating the occupant region 32, a first further gas generator 40 for the optional inflating of the first child seat region 30 and a second further gas generator 41 for the optional inflating of the second child seat region 31. The second further gas generator 41 is arranged in the region of a C-pillar and thus in the vicinity of the child seat region 31 to be inflated by said gas generator, the first further gas generator 40 in the region of an A-pillar, i.e., on the front side and thus in the vicinity of the child seat region 30, to be inflated by said gas generator. The gas generator 42 is arranged in the region of a B-pillar and thus in the vicinity of the occupant region 32 to be inflated by said gas generator.

A control device 50 is signal-connected with sensors on the ISOFIX fastening systems and the three gas generators 40-42, which is indicated dash-dotted in FIG. 1. Additionally, the control device 50 receives signals in particular from a deactivation switch 60 and/or an acceleration sensor 70. The control device 50 can for example be implemented through a control unit (ECU) of the motor vehicle.

In a step S10 (see FIG. 7), it is sensed in advance, in particular when preparing to drive off based on signals from the sensor on the ISOFIX fastening system of the front seat 10 automatically or based on signals from the manually activated deactivation switch 60 if a child seat 20 is arranged on the front seat 10 (S10: "Y") or not (S10: "N") and a corresponding marker K10 is set which indicates if a child seat 20 is arranged on the front seat 10 (K10=1) or not (K10=0). Accordingly, it is sensed in advance in a step S20 if a child seat 21 is arranged on the back seat 11 (S20: "Y") or not (S20: "N") and a corresponding marker K20 set which indicates if a child seat 21 is arranged on the back seat 11 (K20=1) or not (K20=0).

When, following this, the control device 50 based on the signals of the acceleration sensor 70 senses an accident of the motor vehicle (see FIG. 7: step S30 "Y"), it activates the gas generator 42 in a step S70, which consequently fills the occupant region 32, so that the gas bag unfurls as curtain airbag in front of the front and rear side window region of the motor vehicle and forms a gas-inflated volume for the lateral protection of the occupants.

Figure 7:
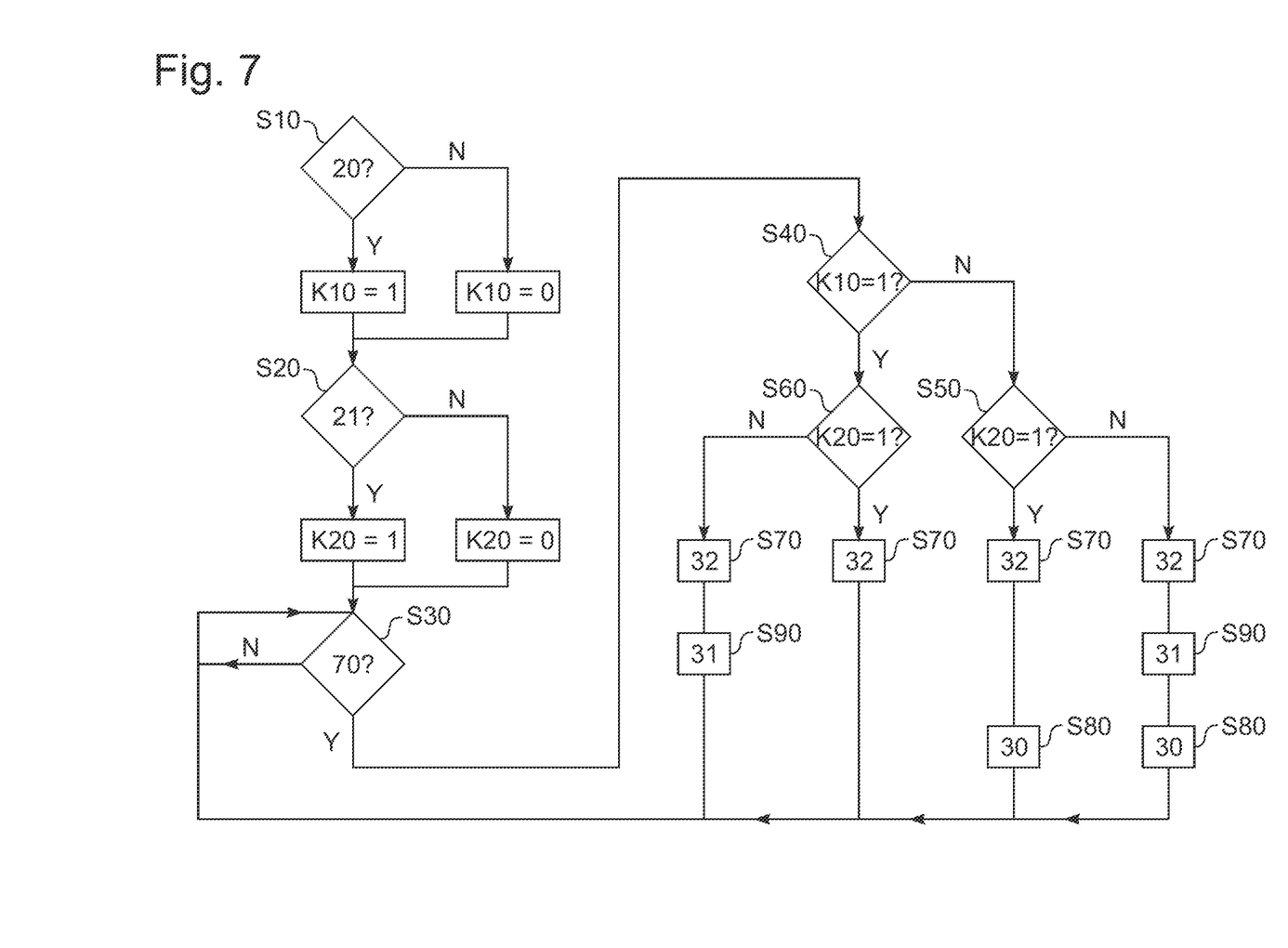
FIG. 7 is a method for inflating the side airbag gas bag of the embodiments.

In the event that the control device 50 has sensed in advance that a child seat 20 is arranged on the front seat 10, i.e. the marker K10=1 is set (S40 "Y"), it omits or stops an activation of the first further gas generator 40. Additionally or alternatively, the control device 50 can omit or stop a releasing of catch bands or the like, which counteract a volume enlargement of the first child seat region 30 (not shown).

The first child seat region 30 is thus not inflated and thus forms a recess for receiving a contour of the front child seat 20. At the same time, the adjoining inflated occupant region 32 additionally protects occupants, for example occupants next to the child seat 20 or a child in the child seat 20. Otherwise (S40 "N") the control device 50 activates the first further gas generator 40 in a step S80 before, simultaneously with or after the gas generator 42. Additionally or alternatively it can release the catch bands by igniting ignition pills or the like (not shown). The first child seat region 30 is thus inflated and thus forms a volume for the lateral protection of an occupant on the front seat 10. In this way, (see S40 "Y"/ "N") a recess for receiving a contour of the child seat 20 or a volume for the lateral protection of an occupant of the seat 10 is thus optionally formed, depending on whether it was sensed beforehand that a child seat 20 is arranged on the front seat 10 or not.

In corresponding manner, the control device 50 omits or stops an activation of the second further gas generator 41 and/or a releasing of catch bands or the like, which counteract a volume enlargement of the second child seat region 31, in the case that the control device 50 has sensed beforehand that a child seat 21 is arranged on the back seat 11, i.e. the marker K20=1 is set (S50/S60 "Y"). The second child seat region 31 is thus not inflated and thus forms a recess for receiving a contour of the back child seat 21. Otherwise (S50/S60 "N") the control device 50 activates the second further gas generator 41 simultaneously with or after the gas generator 42 in a step S90 and/or releases the catch bands 40. In this way, a recess for receiving a contour of the child seat 21 or a volume for the lateral protection of an occupant of the seat 11 is formed likewise optionally (see S50, S60 "Y"/"N") depending on whether it was sensed beforehand that a child seat 21 is arranged on the back seat 11 or not.

Figure 2:
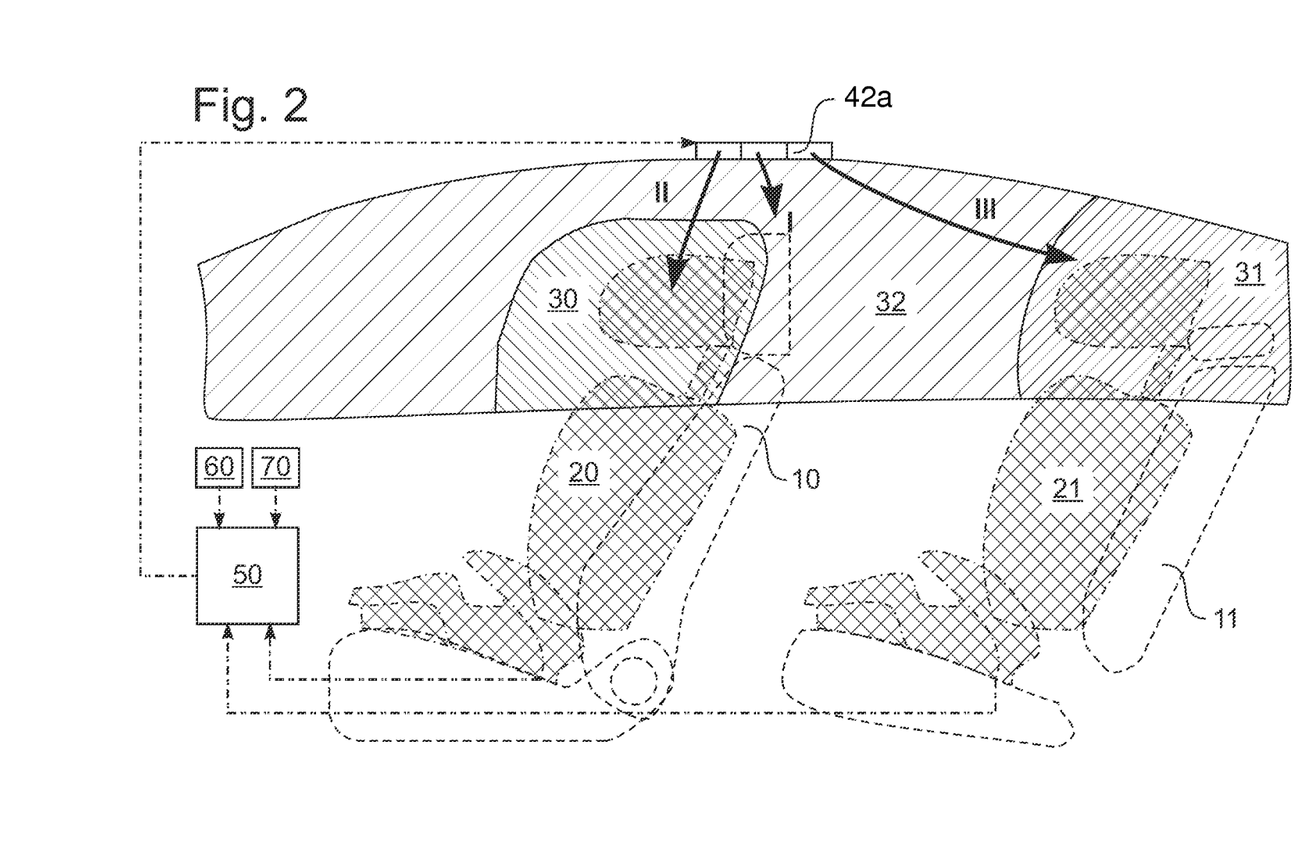
FIG. 2 is a motor vehicle with a side airbag arrangement with an inflated side airbag gas bag according to a further embodiment in a representation corresponding to FIG. 1.

FIG. 2 shows a motor vehicle in a representation corresponding to FIG. 1 with a side airbag arrangement with an inflated side airbag gas bag according to a further embodiment. Elements which correspond to one another are marked with identical reference numbers, so that reference is made to the above description and only differences are discussed in the following.

In the embodiment of FIG. 2, a three-stage gas generator 42a is provided for inflating the occupant region 32 and for optionally inflating the child seat regions 30, 31. Instead of the optional activation of the first or second further gas generator 40 and 41 respectively, the control device 50 with this embodiment activates a second or third stage of the three-stage gas generator 42a optionally, in order to form a volume for the lateral protection of an occupant on the front or back seat 10 and 11 respectively (see FIG. 7: S80 and S90), through the first or second child seat region 30 and 31 respectively, or suppresses an activation of the second or third stage in order to instead form a recess for receiving a contour of the child seat 20 and 21 respectively (see FIG. 7: S40, S50/S60 "Y") through the first and second child seat region 30 and 31 respectively. In FIG. 2, the gas flows as a consequence of the activation of the first stage ("I"), of the second stage ("II") and of the third stage ("III") are indicated. The gas flow II and III respectively to the first and second child seat region 30 and 31 respectively can for example be routed through channels in the occupant region 32.

Figure 3:
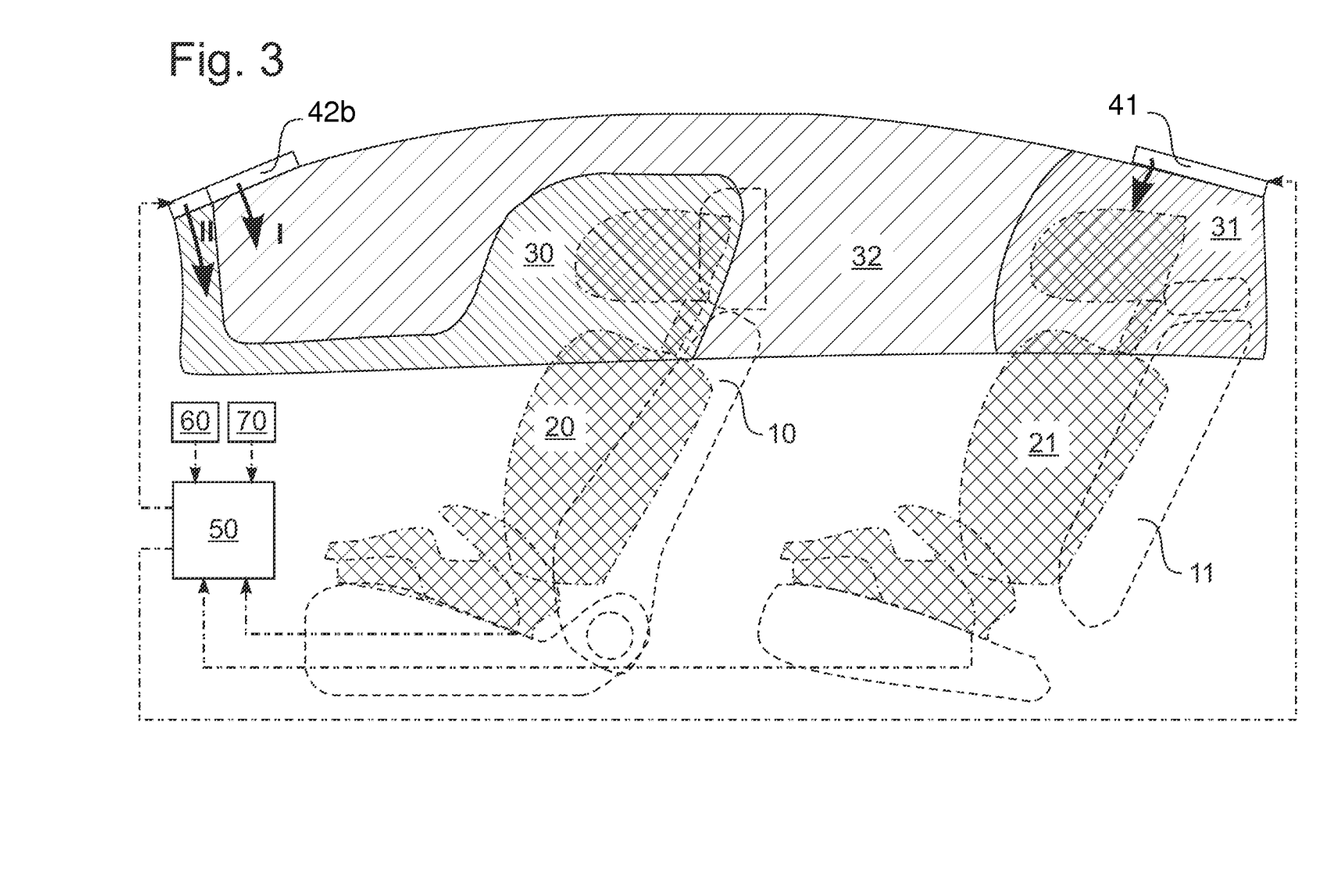
FIG. 3 is a motor vehicle with a side airbag arrangement with an inflated side airbag gas bag according to a further embodiment in a representation corresponding to FIG. 1.

FIG. 3 shows a motor vehicle in a representation corresponding to FIG. 1, 2 with a side airbag arrangement with an inflated side airbag gas bag according to a further embodiment. Elements corresponding to one another are marked with identical reference numbers so that reference is made to the above description and only differences are discussed in the following.

In the embodiment of FIG. 3, a two-stage gas generator 42b for inflating the occupant region 32 through a gas flow I as a consequence of the activation of the first stage and for the optional inflating of the first child seat region 30 through a gas flow II as a consequence of the activation of the second stage and a further gas generator 41 for the optional inflating of the second child seat region 31 are activated by the control device 50.

Figure 4:
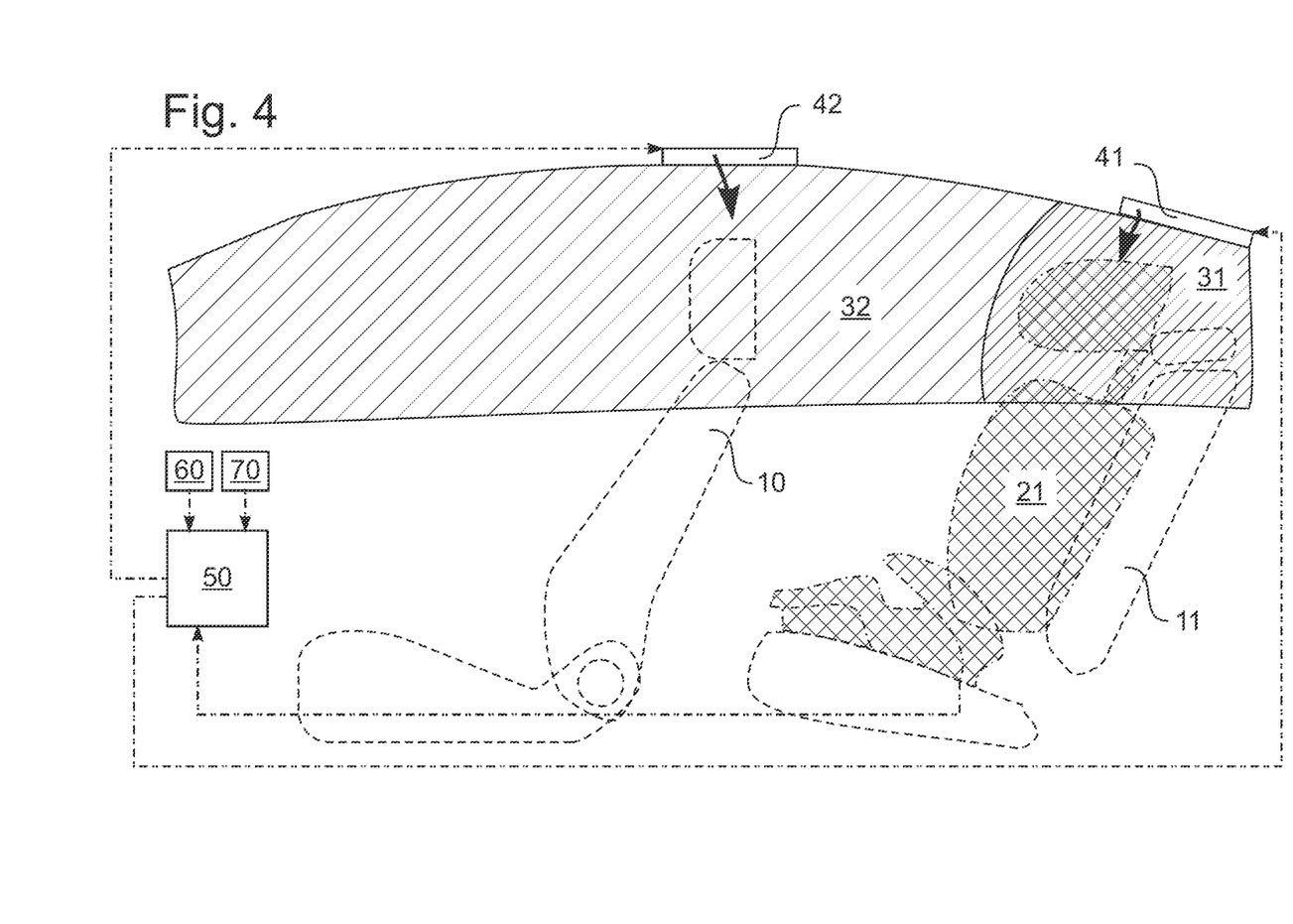
FIG. 4 a motor vehicle with a side airbag arrangement with an inflated side airbag gas bag according to a further embodiment in a representation corresponding to FIG. 1.

FIG. 4 shows a motor vehicle in a representation corresponding to FIG. 1 to FIG. 3 with a side airbag arrangement with an inflated side airbag gas bag according to a further embodiment. Elements corresponding to one another are marked with identical reference numbers so that reference is made to the above description and only differences are discussed in the following. In the embodiment of FIG. 4, a child seat region 31 is only provided for the back seat 11, otherwise the embodiment corresponds in particular to the embodiment of FIG. 1.

Figure 5:
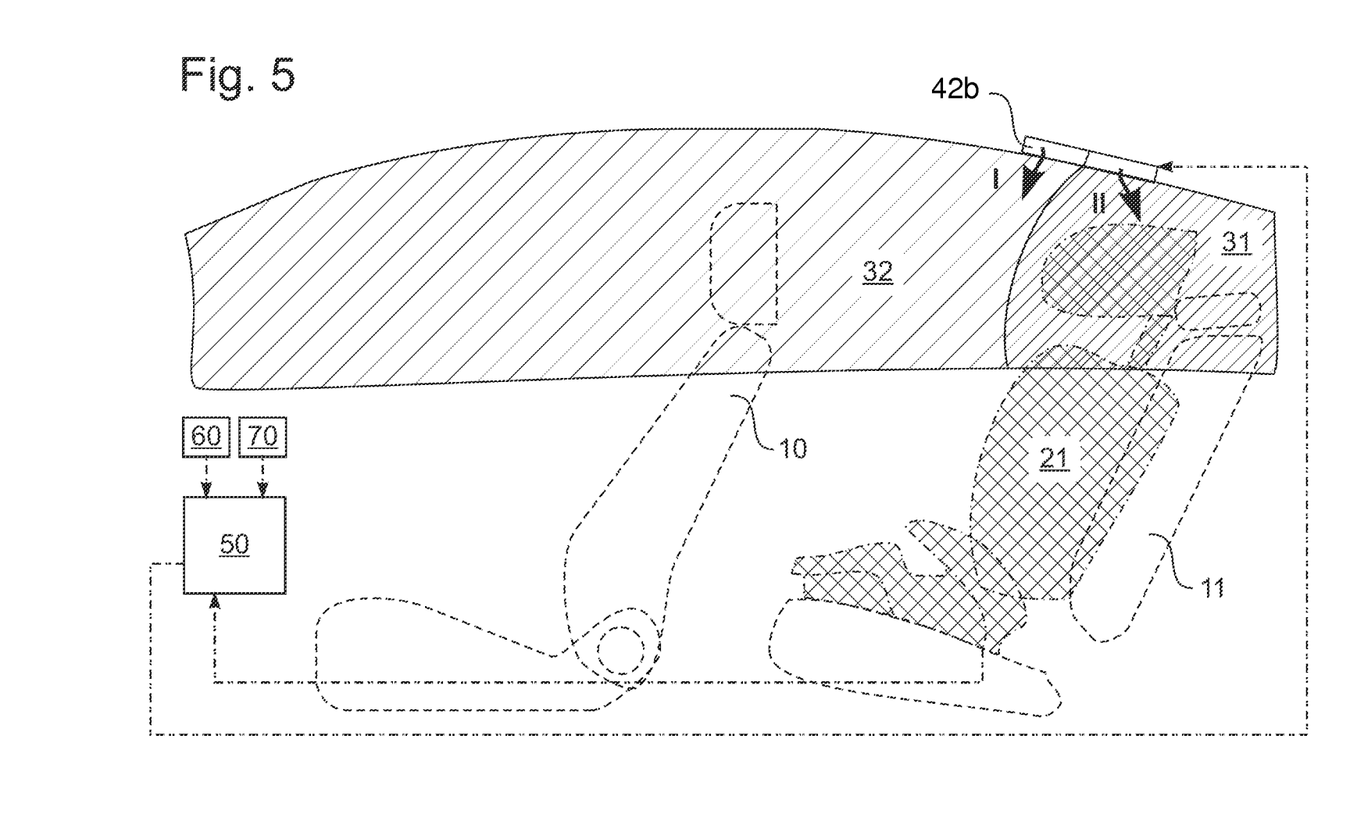
FIG. 5 is a motor vehicle with a side airbag arrangement with an inflated side airbag gas bag according to a further embodiment in a representation corresponding to FIG. 1.

FIG. 5 shows a motor vehicle in a representation corresponding to FIG. 1 to FIG. 4 with a side airbag arrangement with an inflated side airbag gas bag according to a further embodiment. Elements corresponding to one another are marked with identical reference numbers so that reference is made to the above description and only differences are discussed in the following. In the embodiment of FIG. 5, a two-stage gas generator 42b is provided for inflating the occupant region 32 and for optionally inflating the child seat region 31. The embodiment corresponds in particular to a combination of the embodiments of FIG. 3 and FIG. 4.

Figure 6:
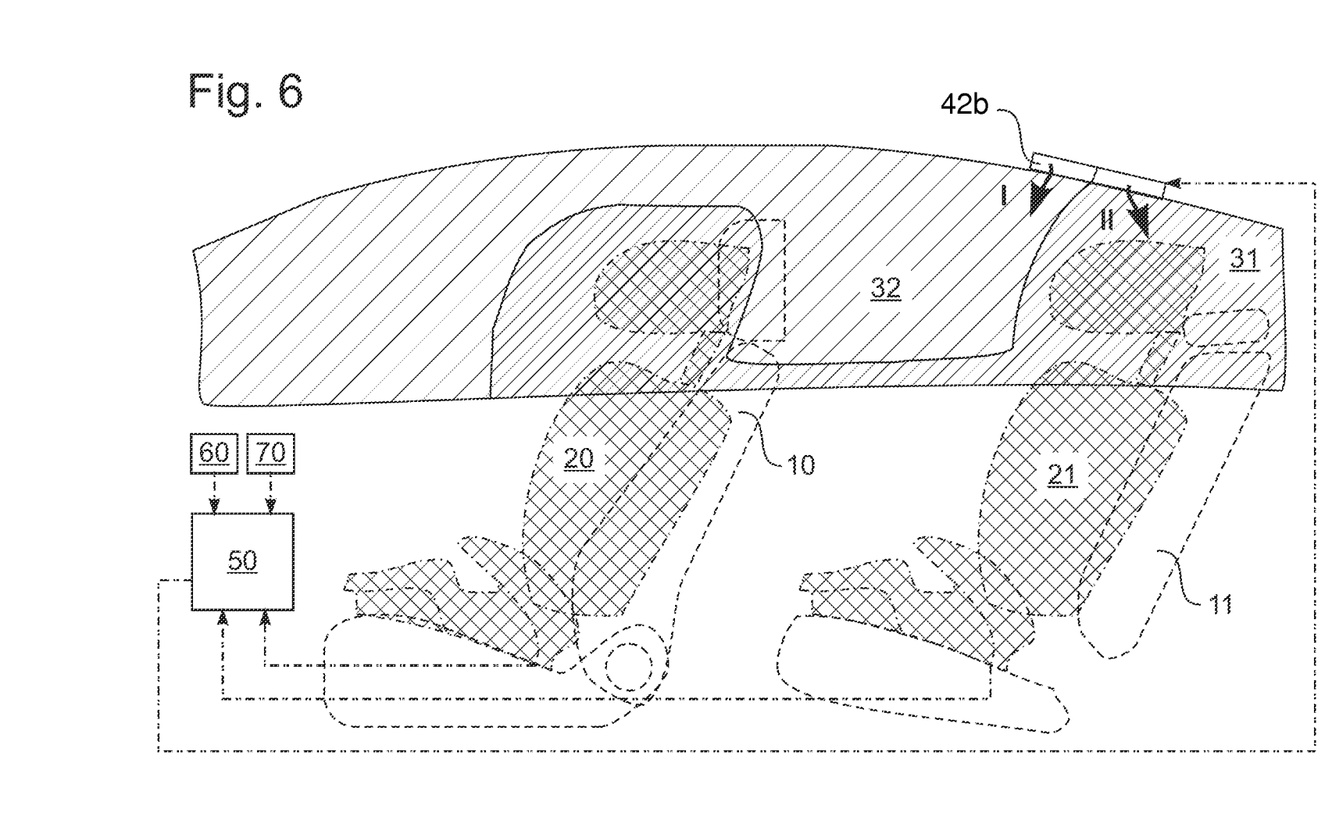
FIG. 6 is a motor vehicle with a side airbag arrangement with an inflated side airbag gas bag according to a further embodiment in a representation corresponding to FIG. 1.

FIG. 6 shows a motor vehicle in a representation corresponding to FIG. 1 to FIG. 5 with a side airbag arrangement with an inflated side airbag gas bag according to a further embodiment. Elements corresponding to one another are marked with identical reference numbers so that reference is made to the above description and only differences are discussed in the following.

The embodiment substantially corresponds to the embodiment of FIG. 5. However in addition to the second child seat region 31 of the gas bag a first child seat region 30 is provided, which fluidically communicates with the second child seat region 31 and is thus inflated through the one gas flow II as a consequence of the activation of the second stage of the two-stage gas generator 42b optionally together with the second child seat region 31.

Although in the preceding description exemplary embodiments were explained it is pointed out that a multiplicity of modifications is possible. Thus, the motor vehicle only has two rows of seats in the exemplarily embodiments. However, the embodiments are not restricted to this, the motor vehicle can equally comprise three or more rows of seats, wherein the gas bag can be provided for the lateral protection of one or a plurality of, in particular of all rows of seats or can form recesses for receiving three or more child seats. It is additionally pointed out that the exemplary embodiments are merely examples which are not intended to restrict the scope of protection, the applications and the construction in any way. The person skilled in the art is merely given a guideline for implementing at least one exemplary embodiment through the preceding description, wherein various changes, in particular with respect to the function and arrangement of the described constituent parts can be carried out without leaving the scope of protection, as is obtained from the claims and the features combinations equivalent to these.

What is claimed is:

1. An airbag gas bag for a motor vehicle, comprising:
   an occupant region; and
   a child seat region adjoining the occupant region, which with the gas bag optionally forms a recess;
   wherein the child seat region is defined by a separate and optionally inflatable chamber.

2. The airbag gas bag according to claim 1, further comprising a further child seat region, which with the gas bag optionally forms the recess.

3. The airbag gas bag according to claim 2, wherein the recess is configured to receive a contour of a further child seat.

4. The airbag gas bag according to claim 2, wherein the recess is configured to receive a volume for a lateral protection of an occupant.

5. The airbag gas bag according to claim 1, wherein the child seat region is defined by an optionally releasable limitation device.

6. The airbag gas bag according to claim 1, wherein the occupant region and the child seat region are connected in a materially joined manner.

7. The airbag gas bag according to claim 1, wherein the occupant region and the child seat region with the gas bag inflated form a common contact area when the child seat region forms a volume for a lateral protection of an occupant.

8. The airbag gas bag according to claim 1, wherein the recess is configured to receive a contour of a child seat.

9. The airbag gas bag according to claim 1, wherein the recess is configured to receive a volume for a lateral protection of an occupant.

10. An airbag gas bag arrangement, comprising:
an airbag gas bag that is inflatable, comprising
an occupant region; and
at least one child seat region adjoining the occupant region, which with the gas bag optionally forms a recess; and
an inflating device, comprising
a gas generator configured to inflate the occupant region of the gas bag; and
a further gas generator configured to optionally inflate the at least one child seat region that is defined by at least one separate chamber; and
a control device in communication with the inflating device and configured to control inflation of the at least one separate chamber defining the at least one child seat region.

11. An airbag arrangement, comprising:
an airbag gas bag that is inflatable, comprising
an occupant region; and
a child seat region adjoining the occupant region, which with the gas bag optionally forms a recess;
an inflating device comprising a multi-stage gas generator that is configured to inflate the occupant region and optionally inflate the child seat region defined by a separate chamber; and
a control device in communication with the inflating device and configured to control inflation of the chamber defining the child seat region.

12. An airbag arrangement, comprising:
an airbag gas bag that is inflatable, comprising
an occupant region; and
a child seat region adjoining the occupant region, which with the gas bag optionally forms a recess;
an inflating device; and
a control device in communication with the inflating device and configured to control inflation of the chamber defining the child seat region;
wherein the control device comprises a sensing device that is configured to automatically sense a child seat.

13. An airbag arrangement, comprising:
an airbag gas bag that is inflatable, comprising
an occupant region; and
a child seat region adjoining the occupant region, which with the gas bag optionally forms a recess;
an inflating device; and
a control device in communication with the inflating device and configured to control inflation of the chamber defining the child seat region;
wherein the control device comprises a sensing device that is configured to automatically sense a manually actuatable switching device for selection between a forming of the recess or of a volume of the child seat region.

* * * * *